US00RE44448E

(19) United States
(12) Reissued Patent
Yi et al.

(10) Patent Number: US RE44,448 E
(45) Date of Reissued Patent: Aug. 20, 2013

(54) ELECTRICAL CONNECTOR WITH ESD PROTECTION

(75) Inventors: Chong Yi, Mechanicsburg, PA (US); Tod M. Harlan, Mechanicsburg, PA (US); Richard L. Malehorn, York, PA (US); Jia-Yong He, Kunshan (CN); Terrance F. Little, Fullerton, CA (US)

(73) Assignee: Hon Hai Precision Ind. Co., Ltd., Taipei Hsien (TW)

(21) Appl. No.: 13/358,983

(22) Filed: Jan. 26, 2012 (Under 37 CFR 1.47)

Related U.S. Patent Documents

Reissue of:
(64) Patent No.: 7,651,371
Issued: Jan. 26, 2010
Appl. No.: 11/985,426
Filed: Nov. 15, 2007

(51) Int. Cl.
*H01R 13/60* (2006.01)
*H01R 13/66* (2006.01)

(52) U.S. Cl.
USPC ..... 439/541.5

(58) Field of Classification Search
USPC ..... 439/541.5, 79, 660, 676
See application file for complete search history.

(56) References Cited

U.S. PATENT DOCUMENTS 5,947,773 A * 9/1999 Karam ..... 439/676
6,019,631 A * 2/2000 Chen ..... 439/541.5
6,106,338 A * 8/2000 Wu et al. ..... 439/660
6,315,609 B1 * 11/2001 Chung ..... 439/607.01

* cited by examiner

*Primary Examiner* — Javaid Nasri
(74) *Attorney, Agent, or Firm* — Andrus, Sceales, Starke & Sawall, LLP

(57) ABSTRACT

An electrical connector (100) for receiving a mating plug (200) having an insulative housing (10), a set of first contacts (21), and a set of second contacts (22). The insulative housing includes a base portion (13), a wafer (14), and a latch mechanism fastened the wafer to the base portion. The electrical contacts are attached to the insulative housing and each has a contact section (214, 222) connecting with the plug and a mounting section (213, 224) extending out of the insulative housing. The contact sections of the first contacts are staggered with the contact sections of the second contacts along a mating direction of the electrical connector, and wherein the contact sections of the first contacts are closed to a front edge of the wafer.

19 Claims, 18 Drawing Sheets

ELECTRICAL CONNECTOR WITH ESD PROTECTION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to electrical connector, and more particularly to a connector having improved electrical contacts.

2. Description of Related Art

Electrical connectors are typically used to couple PCB (Printed Circuit Board) which have numerous electrical devices. Some electrical connectors have a mating end wherein conductive terminals are exposed for engagement with the terminals of a mating connector. When mating the connectors, opposite charges at the connector interface may result in an ESD between the two connectors. In fact, electrostatic discharges can be generated simply by a person approaching or touching the connector interface or touching the terminal contacts. As known, when the ambient relative humidity drops to fifty percent or below, the human body accumulates a large electrical charge which can be in excess of 20.000 volts. Generally, very little current is associated with an electrostatic discharge; however, the voltage can be high enough to damage or destroy certain types of electrical devices such as semiconductor devices. Consequently, when the connector contacts or terminals are electrically associated with such devices on a circuit board, the electrostatic discharge may damage or destroy the electrical devices on the circuit board.

In order to alleviate the electrostatic discharge problem, some electrical connectors include features to provide ESD protection. In at least some connectors, ESD protection is provided with a shield in the form of a plate, bar, or the like located in close proximity to the connector interface and connected to ground in close proximity to the connector. But in some cases, the electrostatic discharge also occurs at the signal contacts. Please refer to FIG. 16, which discloses an electrical connector 300 having J-shaped contacts 60 and a portion 61 thereof is exposed at the front area of the connector 300. A mating plug 200 includes a plurality of plug contacts 70 for mating with the contacts 60 of the electrical connector 300 and a shell 80 shielding the electrical contacts. At the front area of the electrical connector 300, there is a potential for the high speed contacts 60 to short with the shell 80 of the mating plug 200 which could also result in ESD problem.

Hence, it is desired to provide an electrical connector to overcome the problems mentioned above.

BRIEF SUMMARY OF THE INVENTION

Accordingly, an object of the present invention is to provide an electrical connector having improved electrical contacts for ESD protection.

The present invention is directed to an electrical connector for receiving a plug, comprising an insulative housing, a set of first contacts and a set of second contacts attached to the insulative housing. The insulative housing comprises a base portion and a wafer, and a latch mechanism fastened the wafer to the base portion. The insulative housing defines a mating direction for engaging with the plug. Each electrical contact is attached to the insulative housing and comprises a contact section connecting with the plug and a mounting section extending out of the insulative housing. The contact sections of the first contacts are staggered with the contact sections of the second contacts along the mating direction, and wherein the contacts section of the first contacts are closed to a front edge thereof.

The first contacts can be inserted in the wafer by insert molding. The first contacts also can be pressed into the wafer. The first contacts and the wafer constitute an insert module attached to the base portion simultaneously. The second contacts are inserted into the base portion and the wafer simultaneously. The wafer encloses the first contacts at a front edge thereof to avoid the first contacts connecting with the plug.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
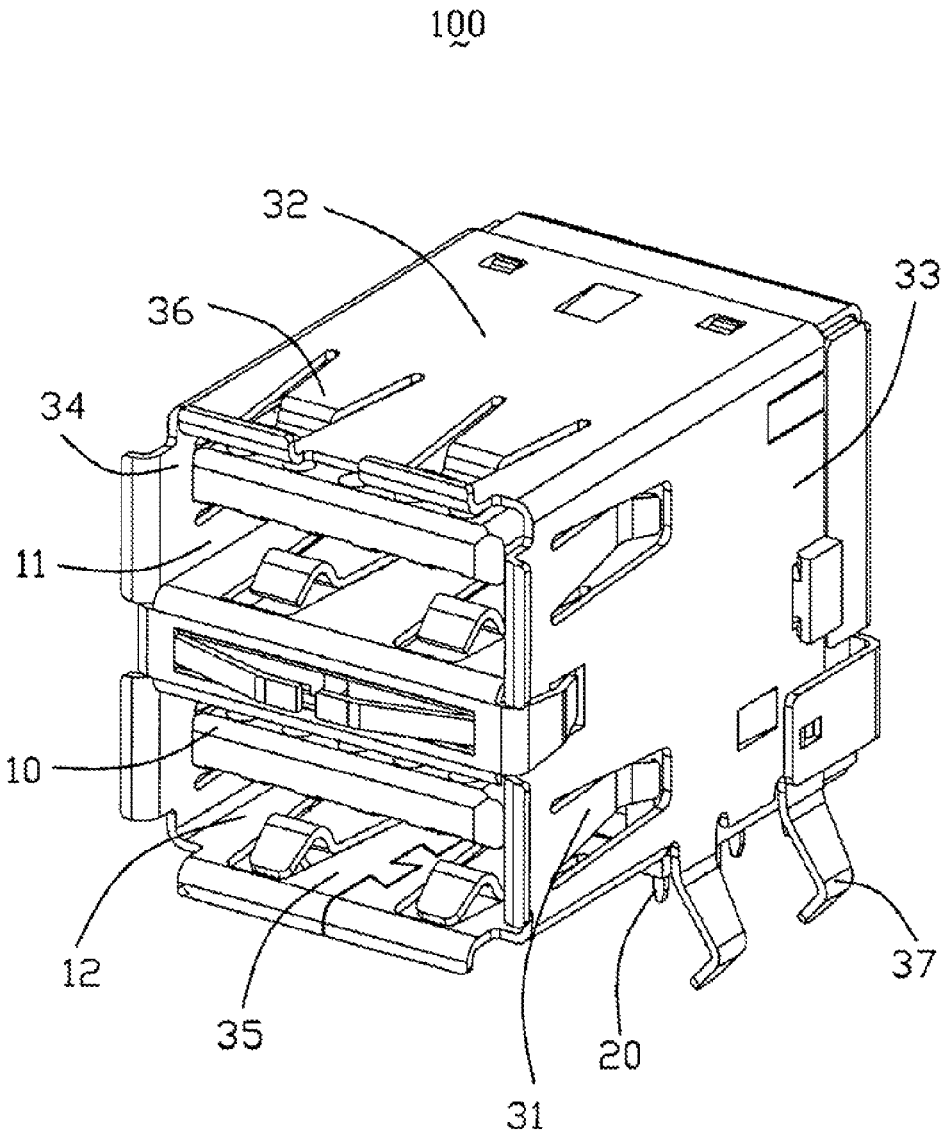
FIG. 1 is a perspective view of an electrical connector according to a first embodiment of the present invention.

Reference will be made to the drawing figures to describe the present invention in detail, wherein depicted elements are not necessarily shown to scale and wherein like of similar elements are designated by same or similar reference numeral through the several views and same or similar terminology.

Figure 16:
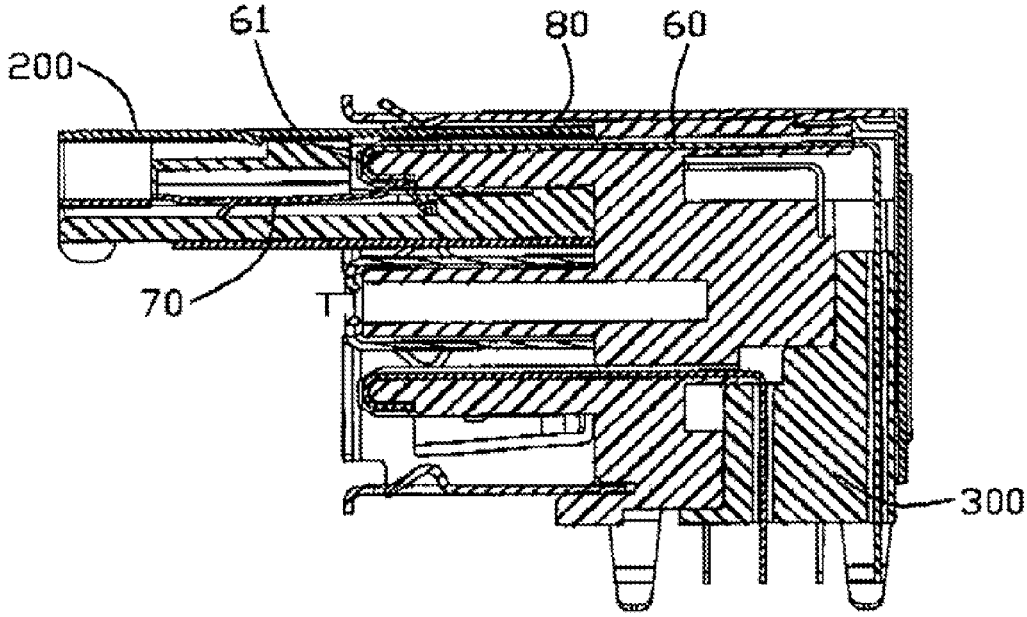
FIG. 16 (PRIOR ART)
FIG. 16 is a cross sectional view of a related art with a mating plug inserted therein.
Figure 17:
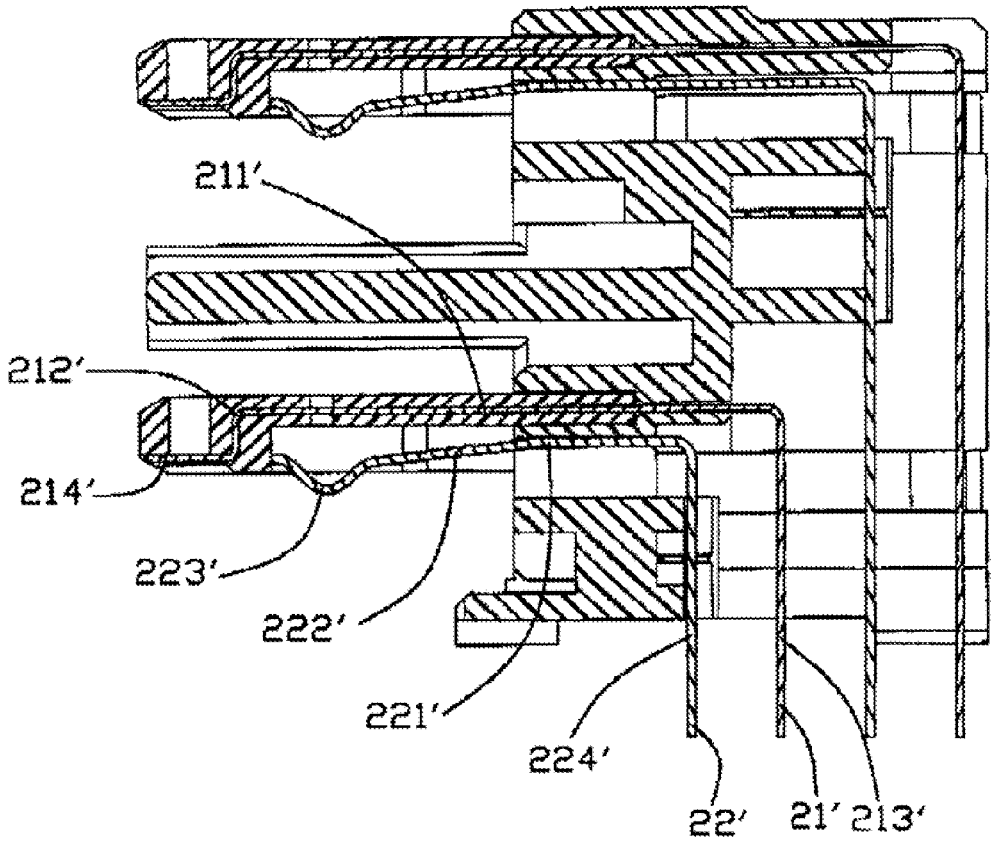
FIG. 17 is a cross-sectional view of the electrical connector of FIG. 9.
Figure 18:
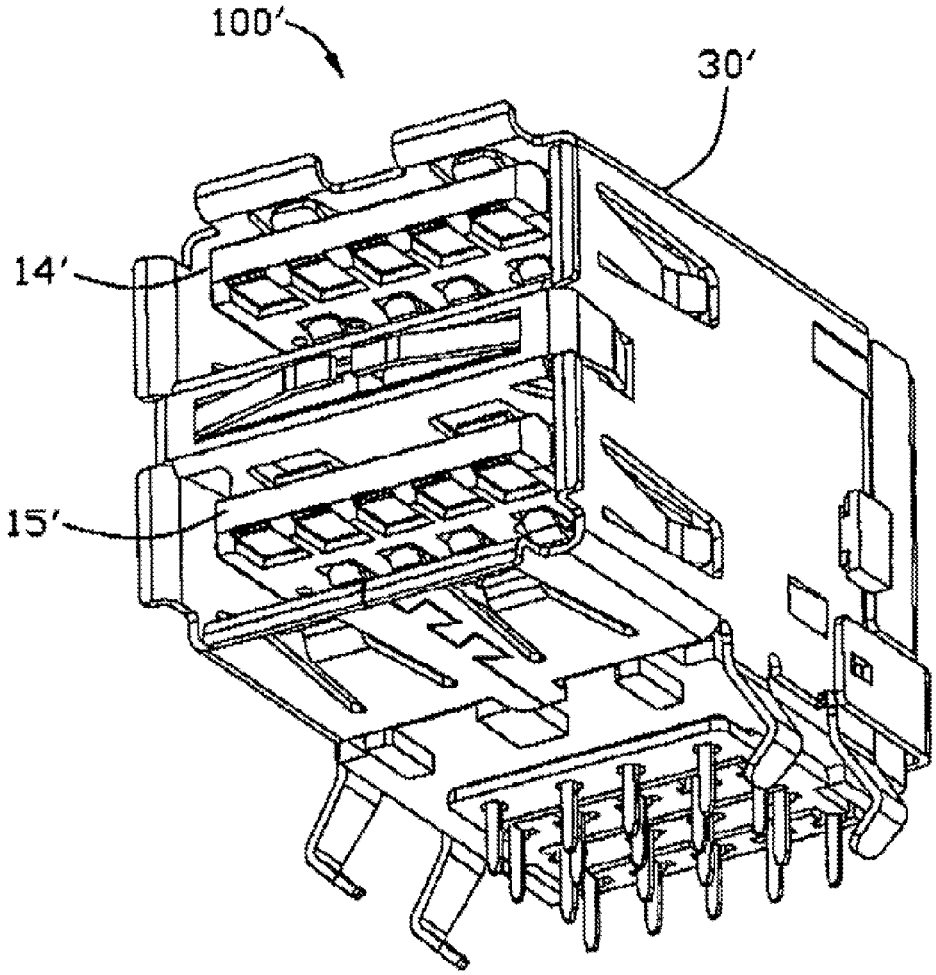
FIG. 18 is a perspective view of the electrical connector of FIG. 9 with a metal shield attached thereon.

Referring to FIG. 1, the present invention is directed to an electrical connector 100 mounting to a PCB or motherboard (not shown) having an insulative housing 10 including a plurality of receiving spaces or receptacle openings 11, 12 each adapted to receive a complementary electrical plug 200 as shown in FIG. 16. The connector 100 includes a plurality of electrical contacts 20 arranged in first and second groups corresponding to their respective receptacle openings 11, 12. The connector 100 has an outer shield 30 that generally surrounds the housing 10 and has grounding contacts 31 to create an electrical connection between the conductive outer shell 80 and the plug 200 when inserted therein.

While the drawings display a dual stacked connector system 100, the present invention could be used with any type of electrical connector. While each receptacle is shown with nine contacts 20 in a group, the invention can be employed with any desired number of contacts 20 in a group. Similarly, while two receptacles 11, 12 are shown, the invention can be employed with a single receptacle or any desired number of stacked receptacles.

Figure 2:
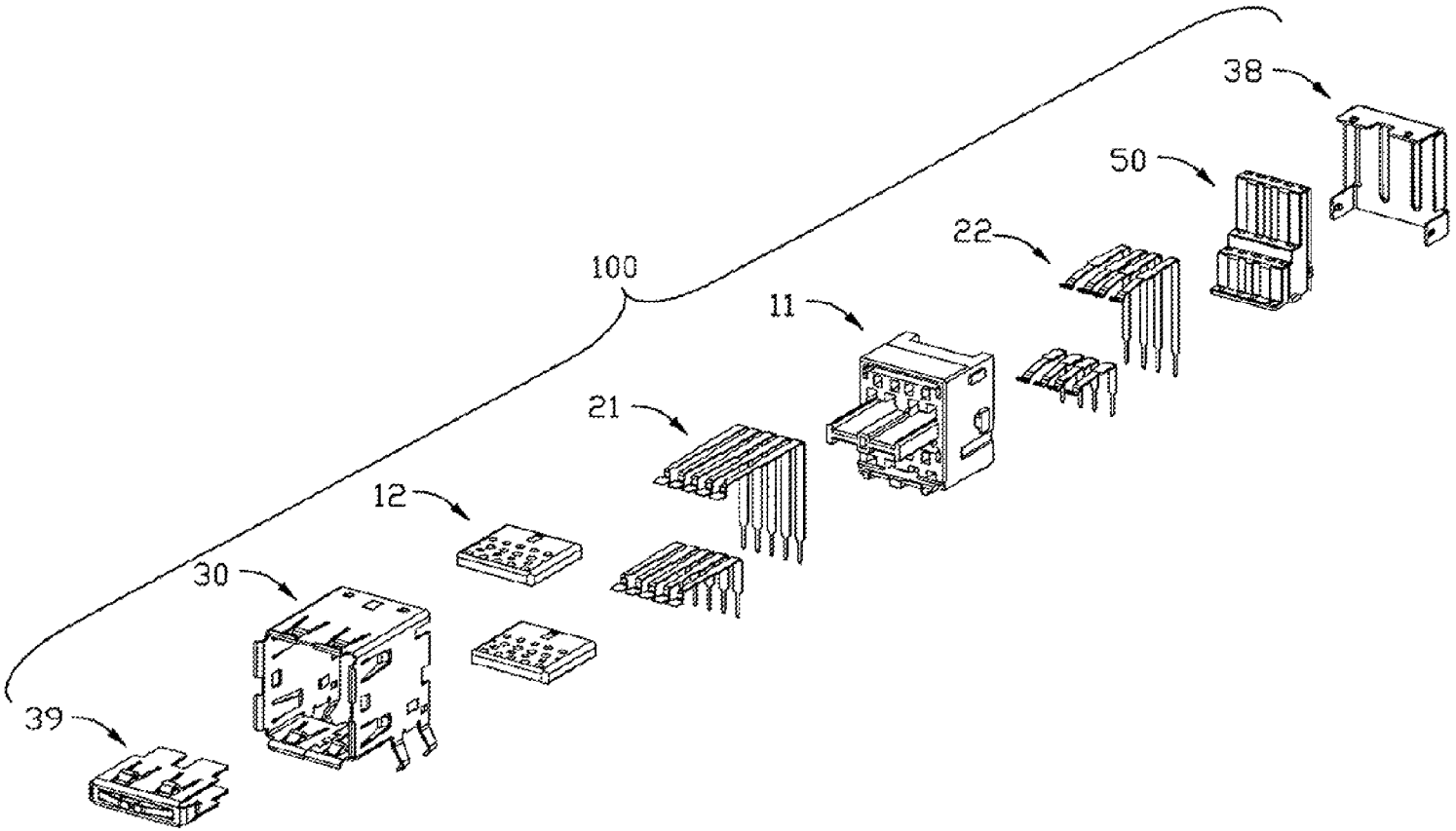
FIG. 2 is an exploded view of the electrical connector shown in FIG. 1.
Figure 3:
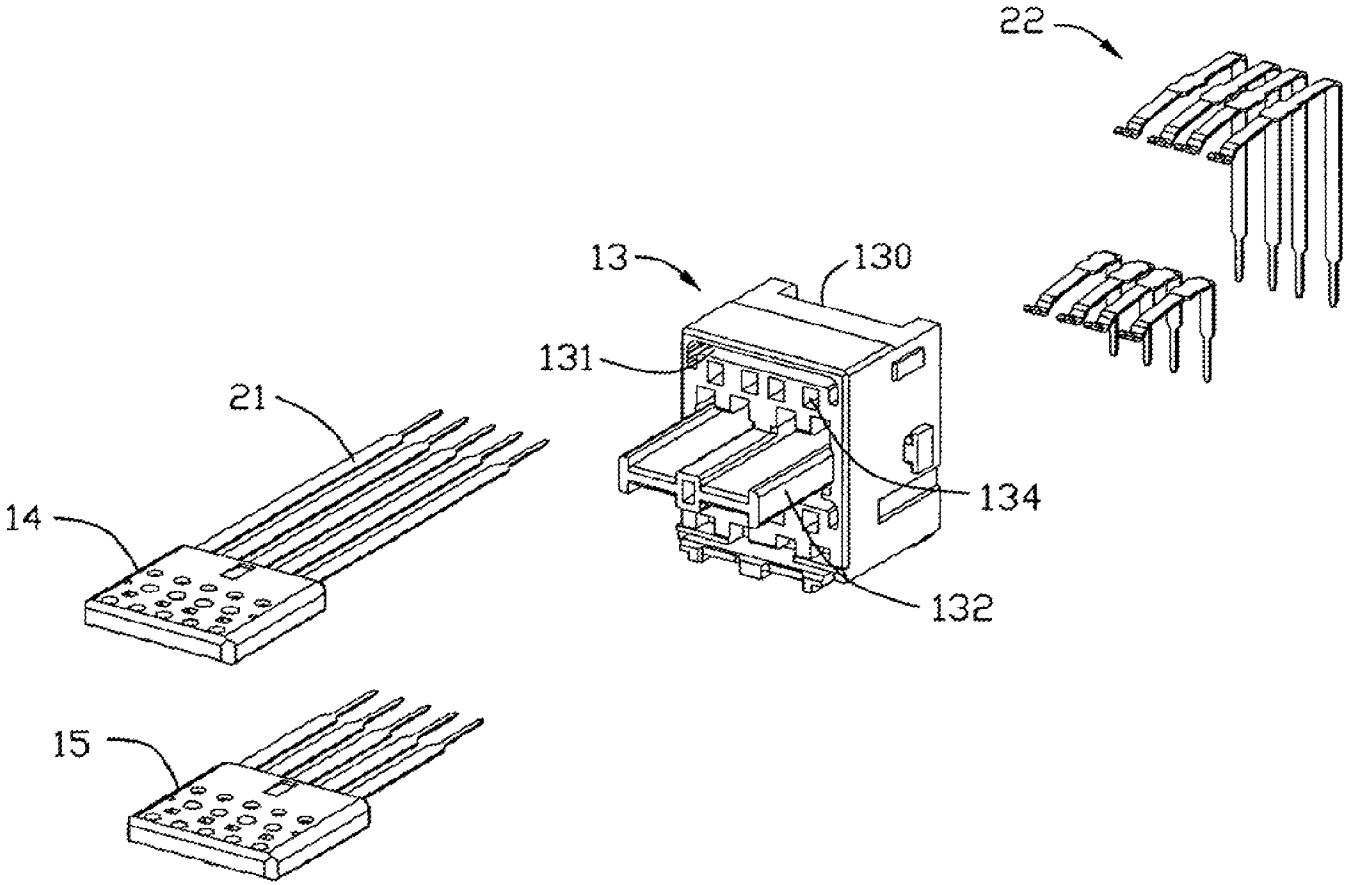
FIG. 3 is a partial view of the electrical connector shown in FIG. 2, showing the relationship of the contacts and the insulative housing before assembling.
Figure 4:
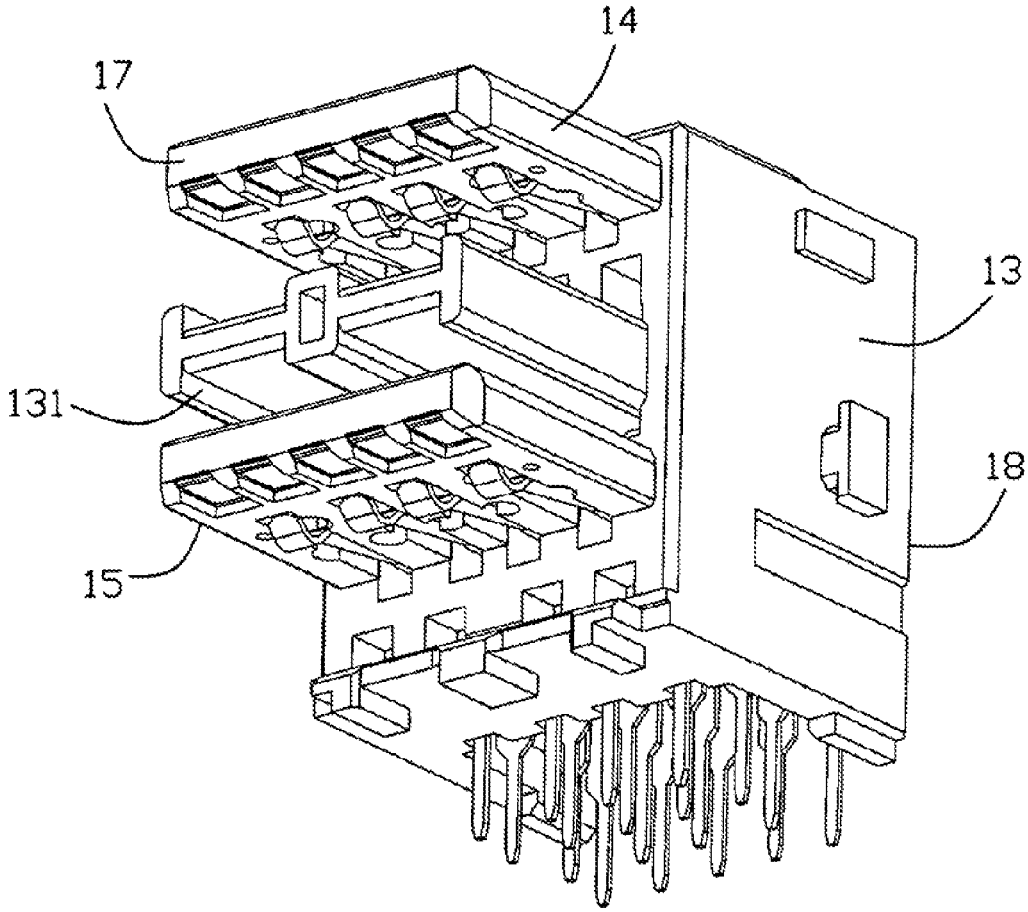
FIG. 4 is a perspective view of the electrical connector shown in FIG. 3, wherein the metal shield is removed therefrom.
Figure 5:
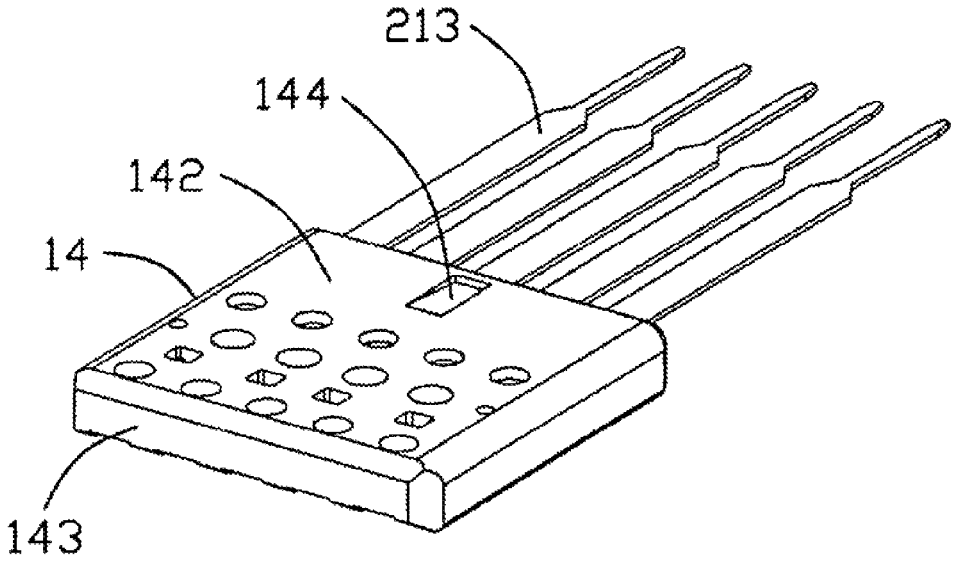
FIG. 5 is a perspective view of the upper contacts and the wafer before assembling to the base portion.
Figure 6:
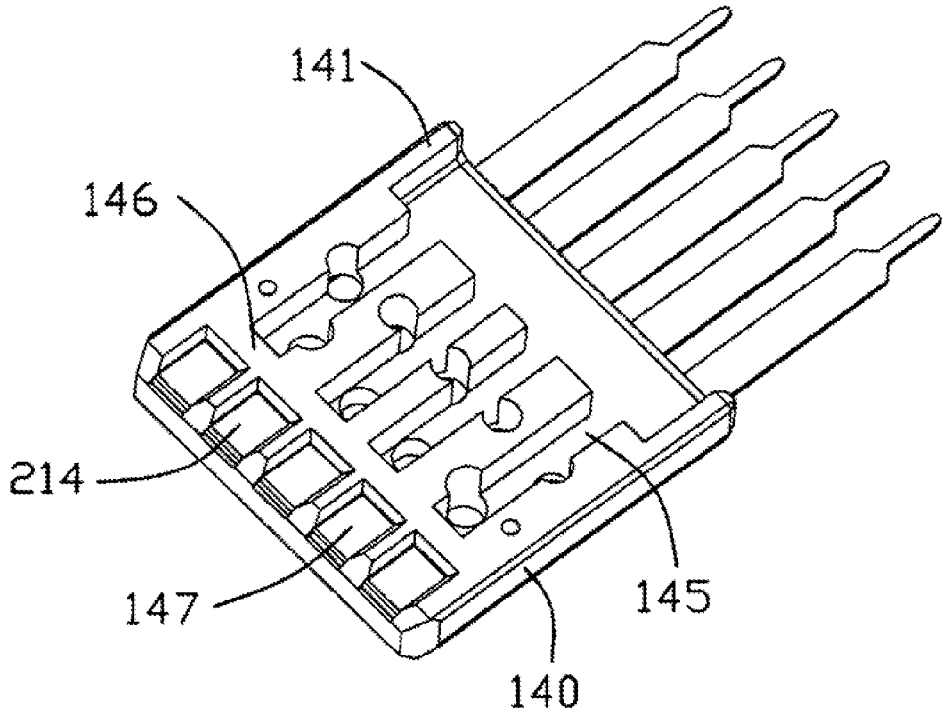
FIG. 6 is similar to FIG. 5, while taken from a different aspect.

Referring to FIGS. 1 and 2, the shield 30 is preferably stamped from a single sheet of suitable conductive material, which includes a top wall 32, opposed lateral walls 33, 34, and a bottom wall 35. The opposed top and bottom walls 32, 35 each have longitudinal springs 36 extending into the receptacles 11, 12 to bear against the corresponding shell 80 of the plug 200. Board locks 37 mate with the PCB and aid in positioning the electrical connector 100 with respect to the PCB. The shield 30 further comprises a separated rear wall 38 and a separate front wall 39 attached thereon for further shielding the electrical contacts 20 at front and rear face 17, 18 of the insulative housing 10.

As illustrated in FIG. 3 to 6, the insulative housing 10 has a base portion 13, two wafers 14, 15, and a latching mechanism fastening the wafers 14, 15 to the base portion 13. The base portion 13 and the wafers 14, 15 carry the electrical contacts 20. The contacts 20 may be signal contacts, power contacts, or ground contacts in various combinations as desired in accordance with a particular application. The base portion 13 comprises a rectangular body 130 provided with two receiving spaces 131 therein and a plurality of passageways 134 below the receiving space 131. A middle flange 132 extends from the rectangular body 130 to separate receptacle openings 11, 12.

Each wafer 14, 15 comprises a tongue 140 and a retention portion 141 extending into the receiving space 131 of base portion 13. The tongue 140 and the base portion 13 defines the receiving opening 11, 12. The wafer 14, 15 comprises a top wall 142 and a front wall 143 perpendicular thereto. The tongue 140 defines a plurality of grooves 145 corresponding to the passageways 134 and a plurality of recesses 147 corresponding to the receiving space 131. An inner bar 146 locates between the grooves 145 and the recesses 147. The latch mechanism comprises a protrusion 133 disposed in the receiving space 131 of the base portion 13 and a recess 144 defining on the retention portion 141 of the wafer 14, 15 to engage with each other, thereby latching the base portion 13 and the wafers 14, 15 together.

Figure 7:
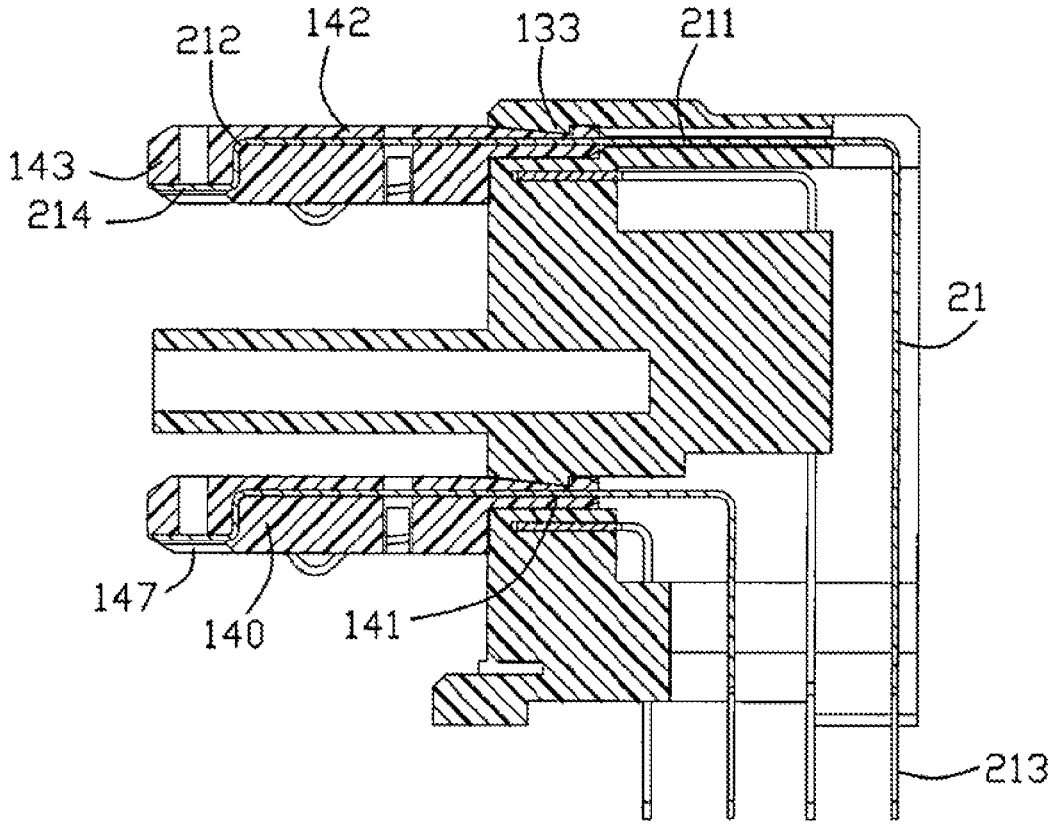
FIG. 7 is a cross sectional view of the insulative housing and the electrical contacts shown in FIG. 4.
Figure 8:
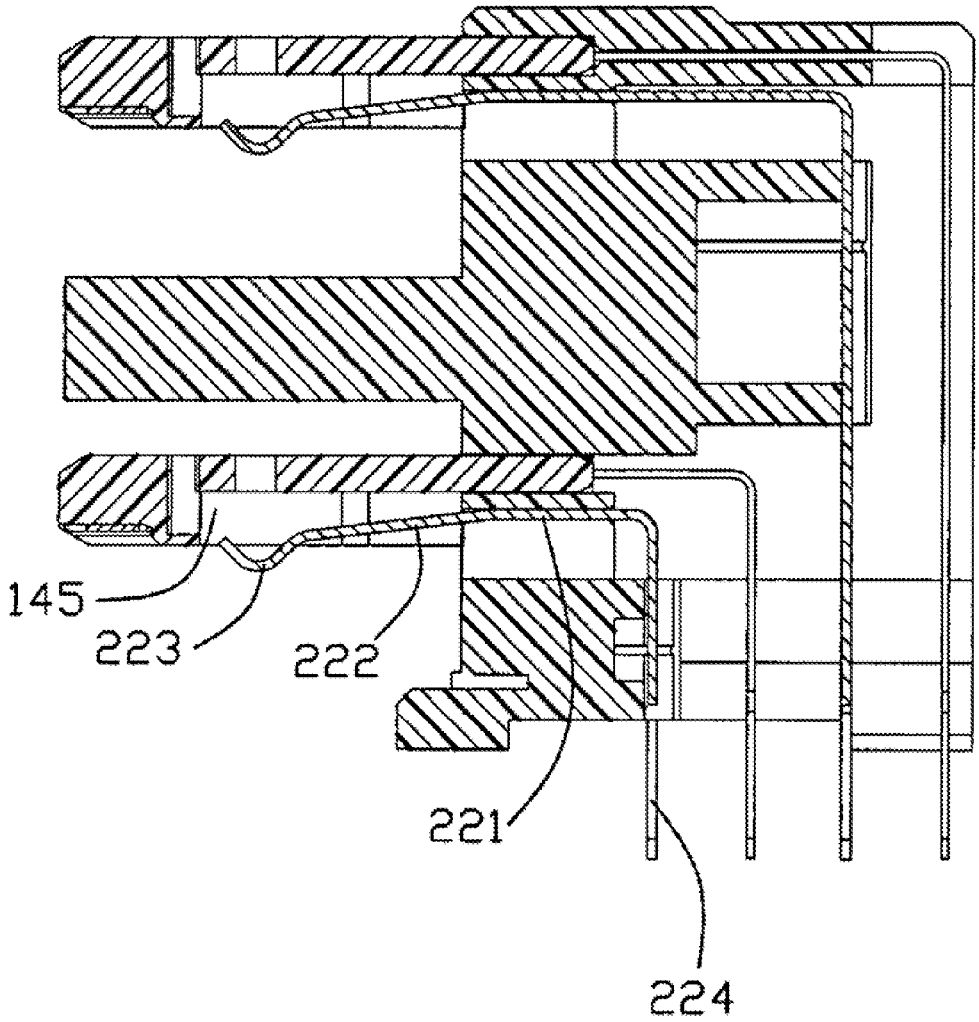
FIG. 8 is a cross sectional view of the insulative housing and the electrical contacts shown in FIG. 4.
Figure 9:
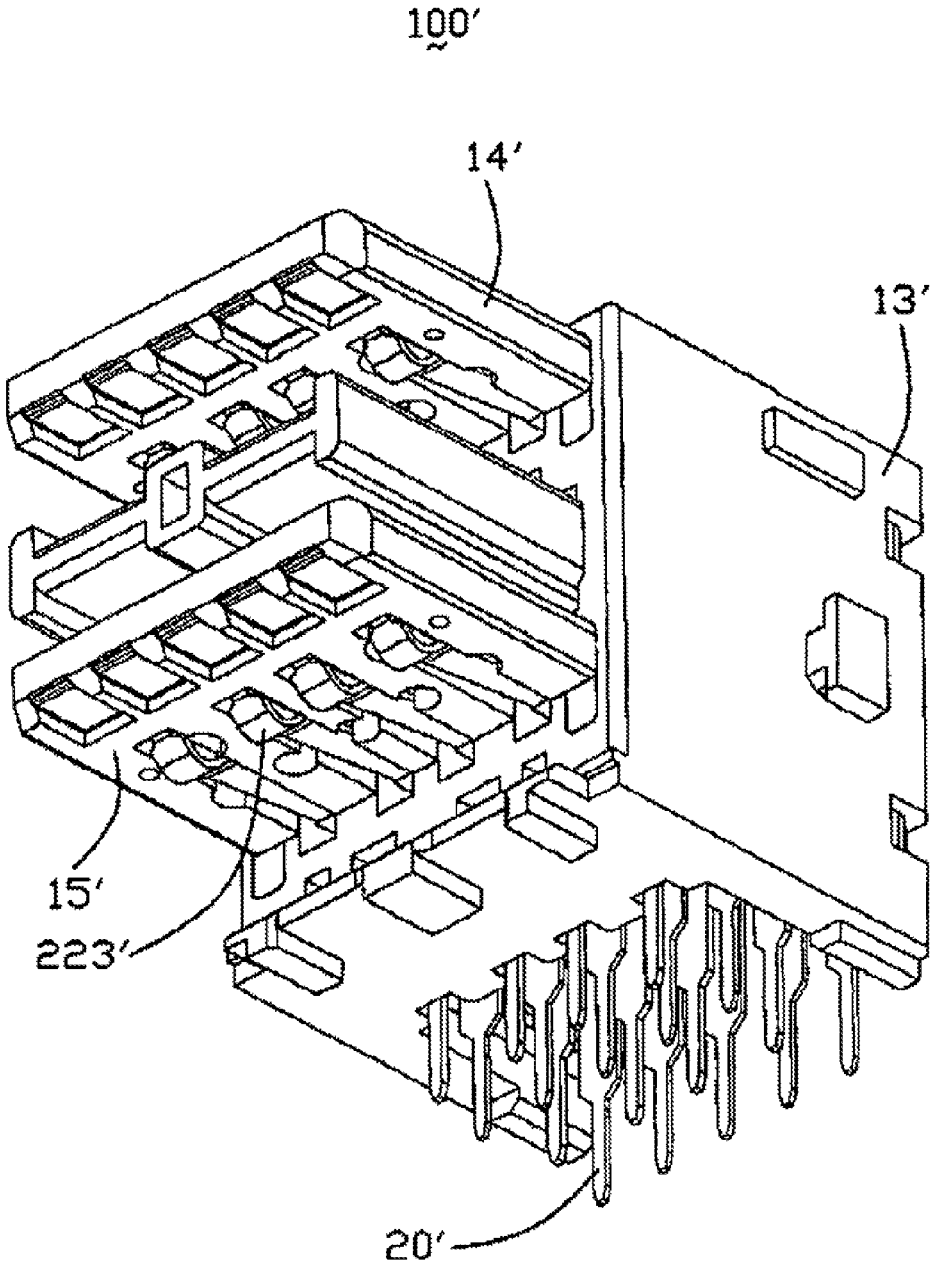
FIG. 9 is a perspective view of an electrical connector according to a second embodiment of the present invention, wherein a metal shield thereof is removed therefrom.
Figure 10:
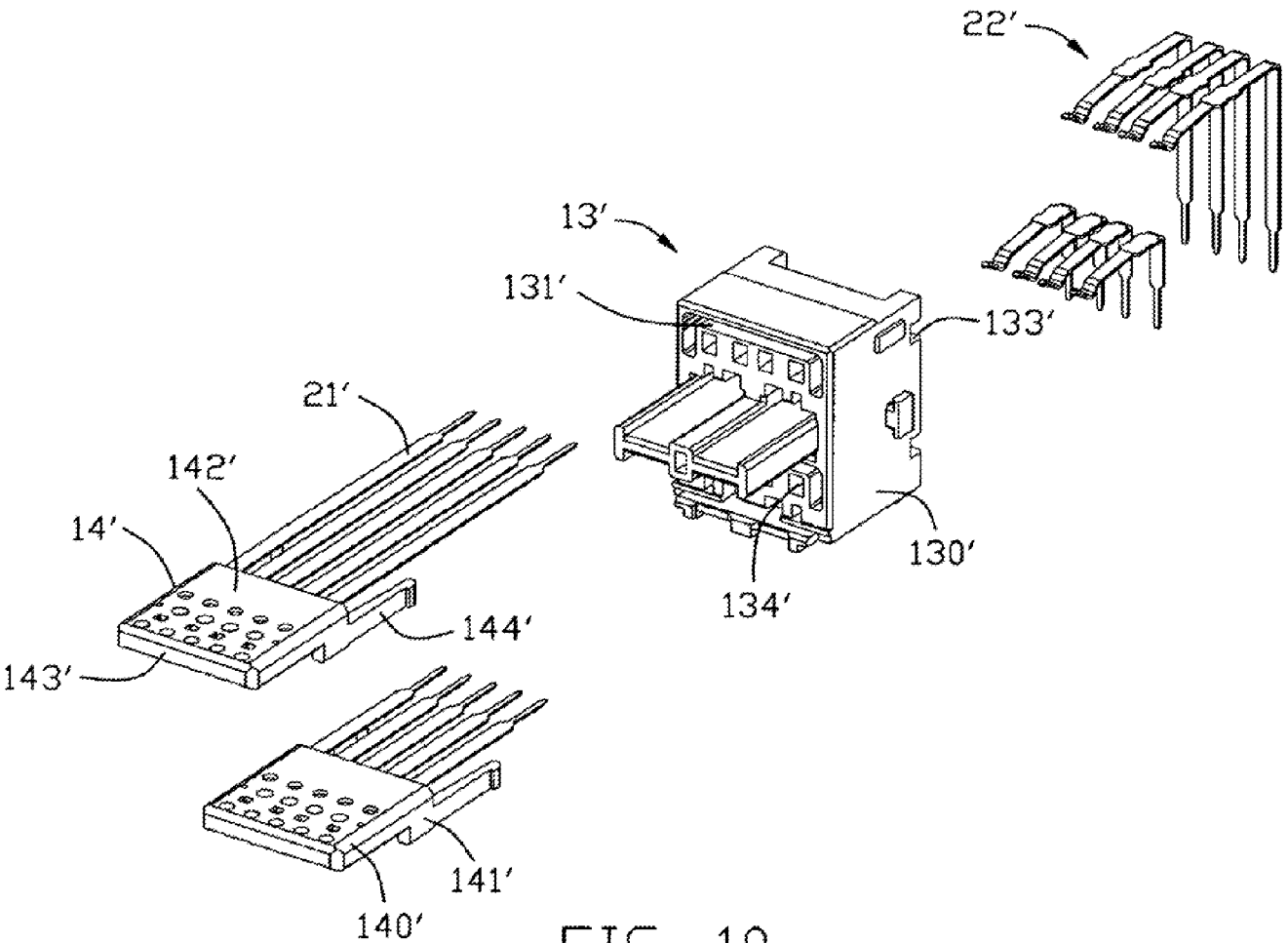
FIG. 10 is a partial view of the electrical connector shown in FIG. 9, showing the relationship of the contacts and the insulative housing before assembling.
Figure 11:
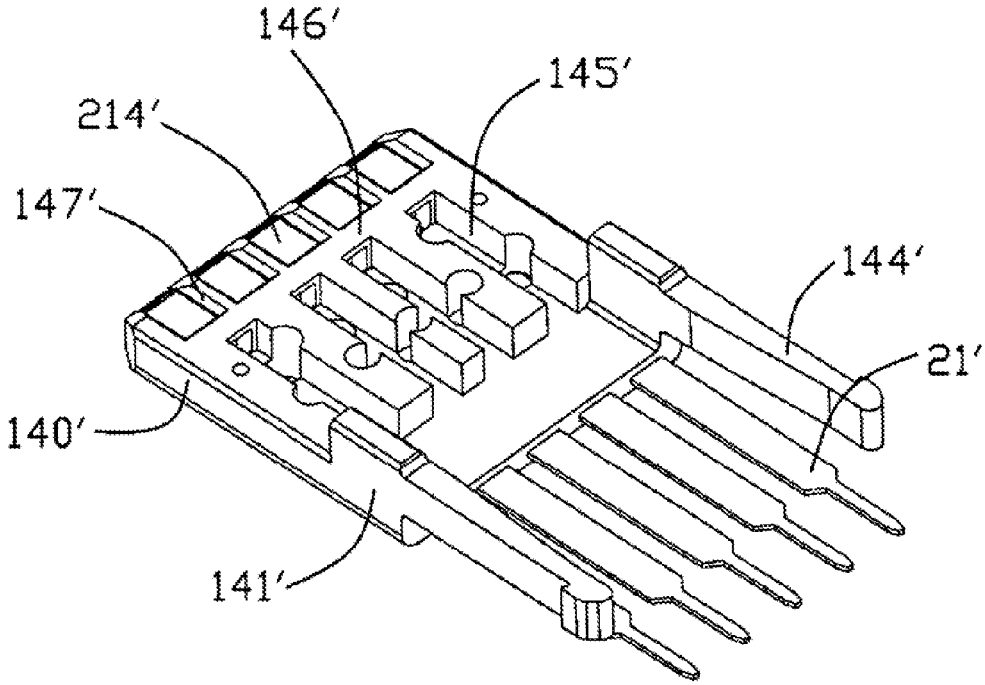
FIG. 11 a perspective view of the upper contacts and the wafer shown in FIG. 10.
Figure 12:
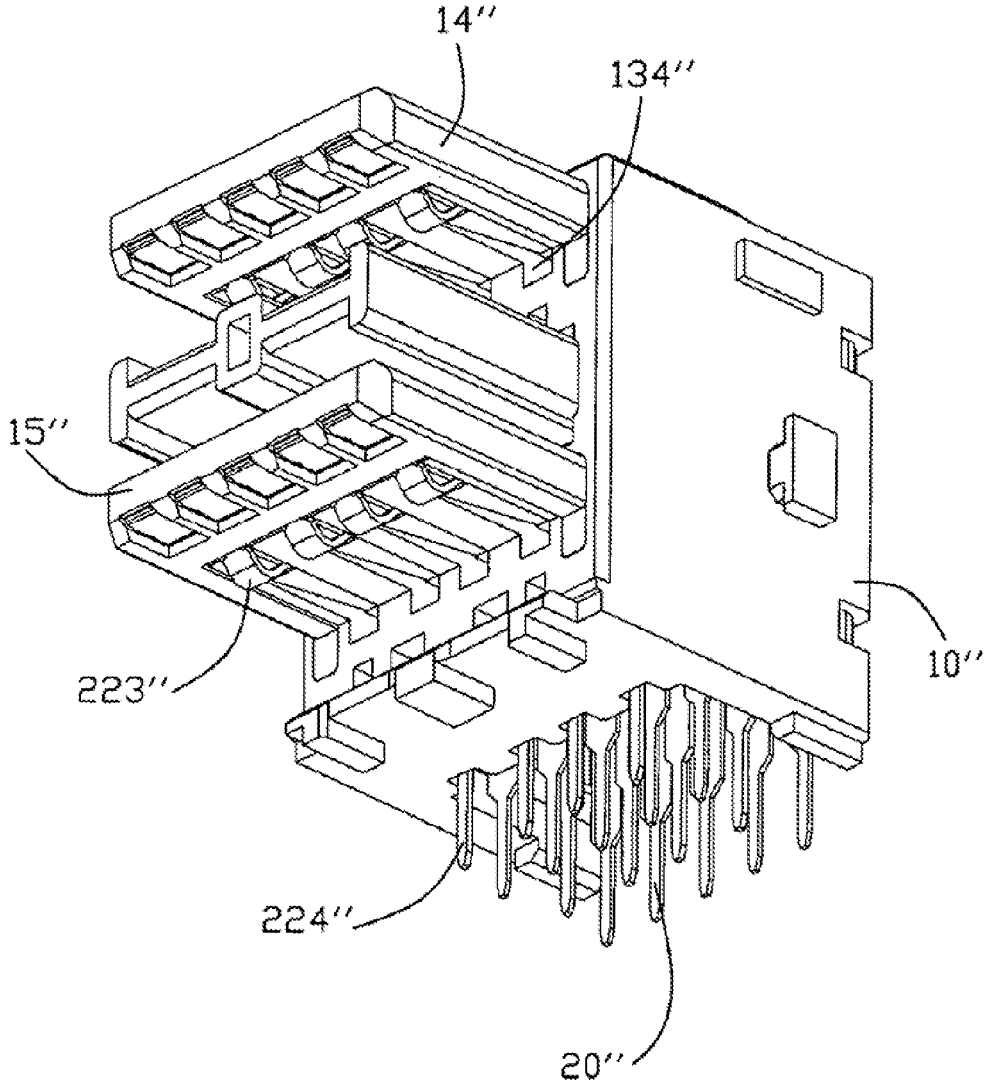
FIG. 12 is a perspective view of the electrical connector according to a third embodiment of the present invention, wherein the metal shield thereof is removed therefrom.
Figure 13:
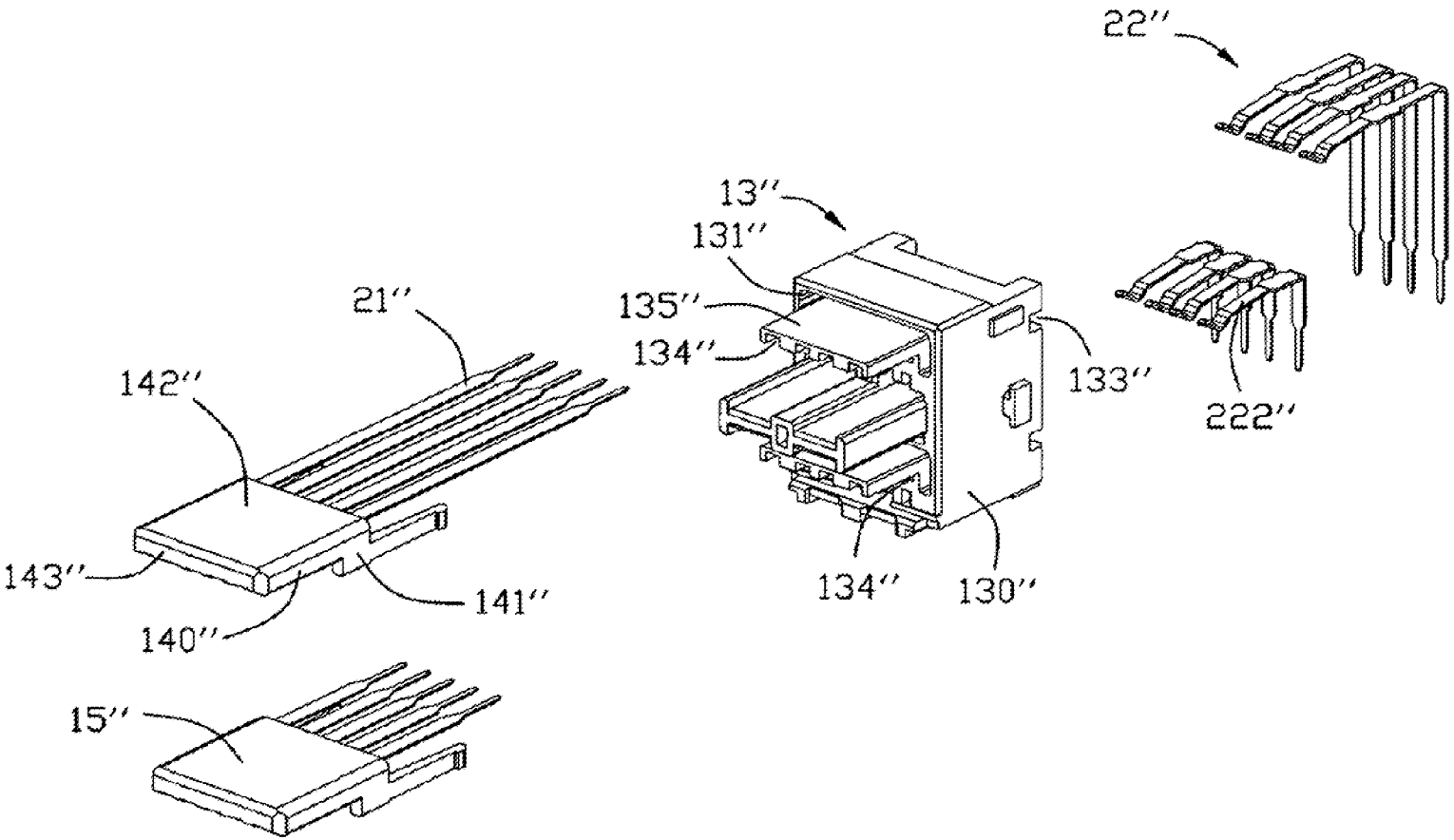
FIG. 13 is a partial view of the electrical connector shown in FIG. 12, showing the relationship of the contacts and the insulative housing before assembling.
Figure 14:
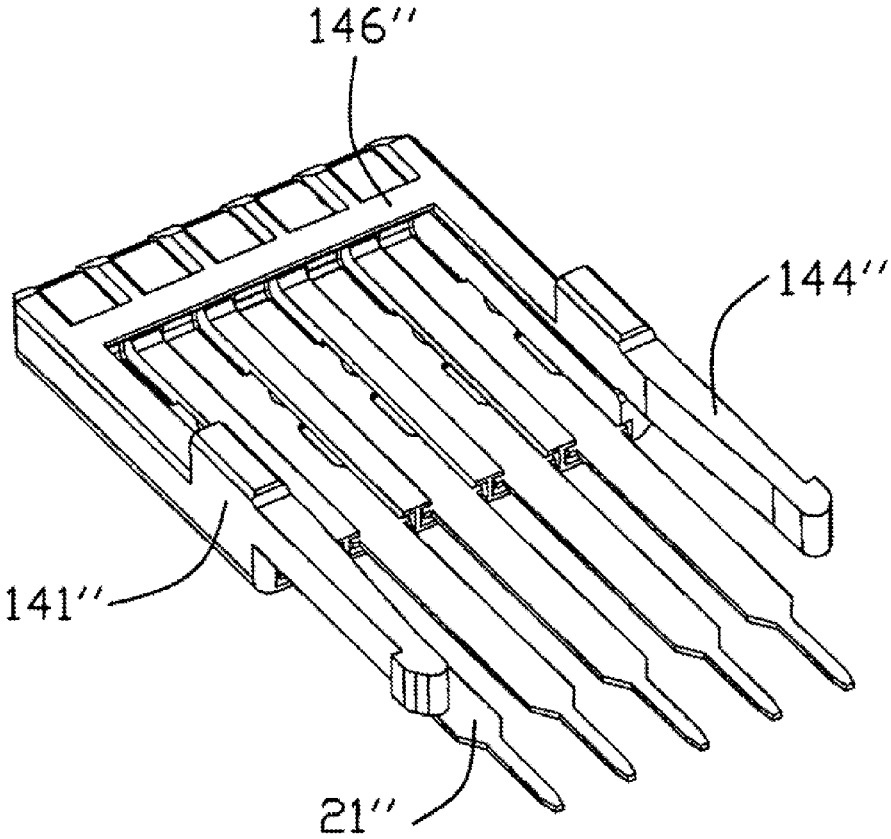
FIG. 14 is a perspective view of the upper contacts and the wafer shown in FIG. 13.
Figure 15:
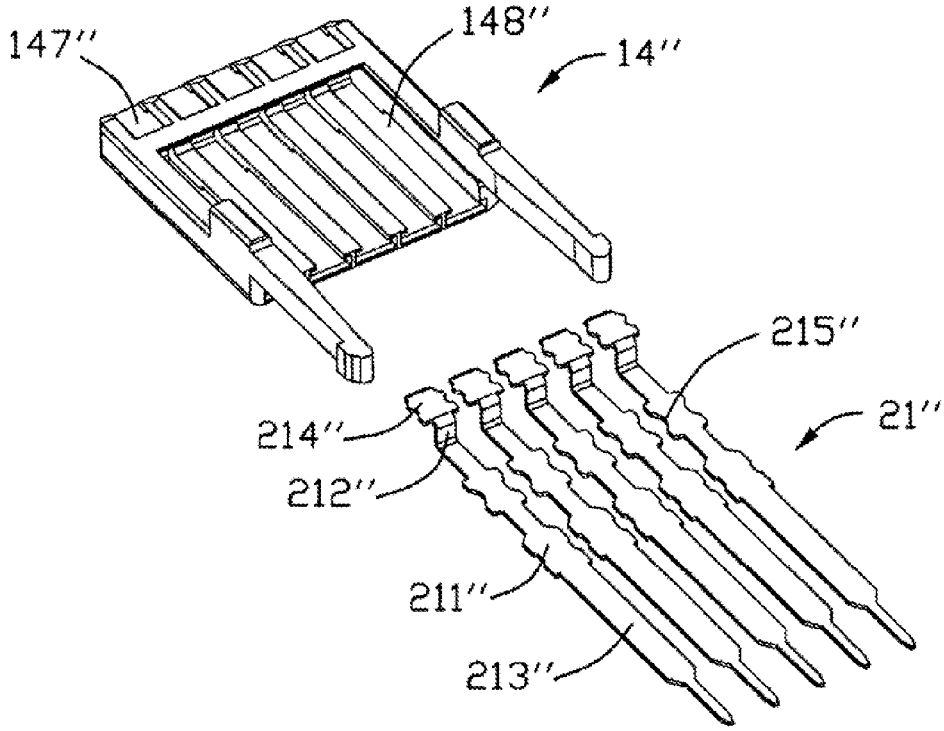
FIG. 15 is an exploded view of the upper contacts and the wafer shown in FIG. 14.

As illustrated in FIGS. 2, 7 and 8, each group of electrical contacts 20 includes a set of upper contacts 21 and a set of lower contacts 22. The lower contacts 22 are inserted into the base portion 13 and the wafer 14, 15 and each includes a body section 221 engaging with the insulative housing 10. An elastic contact section 222 extends from one end of the body section 221 along a mating direction of the electrical connector 100 and has a convex bend 223 for mating with the plug contact 70 of the mating plug 200. The contact sections 222 are arranged in the grooves 145 of the wafer 14, 15. The lower contacts 22 also include a mounting section 224 extending from the other end of the body section 221 for mounting to the PCB.

The upper contacts 21 are inserted in the wafer 14, 15 by insert molding and each includes a body section 211 engaging with the wafer 14, 15 at an upper side thereof, a connect to section 212 bending from one end of the body section 211, and a mounting section 213 extending from the other end of the body section 211. The connect section 212 is extending from a front edge of the body section 211 to a lower side of the wafer 14, 15. A flat non-elastic contact section 214 is extending forwardly from the connect section 212 and parallel to the body section 211. The body section 211 is on top of the contact section 214.

Referring to FIGS. 7 and 8, the contact portions 214, 222 of the upper contacts 21 and the lower contacts 22 are located on the lower side of the wafer 14, 15 and staggered along the mating direction of the electrical connector 100. The contact portions 214 of the upper contacts 21 are arranged in a front position of the receiving opening 11, 12 and closer to the front edge of the wafer 14, 15 than the contact sections 222 of the lower contacts 22. The contact points, namely the contact sections 214 and the convex bends 223 of the upper contacts 21 and the lower contacts 22 also staggered along a vertical direction thereby to mating with the contacts 70 of the plug 200 at different height.

During manufacturing, firstly, form the wafer 14, 15 on the tipper contacts 21 by insert molding and constitute a insert module, wherein the upper contacts 21 are straight at that time. Secondly, press the insert module including the upper contacts 21 and the wafer 14, 15 into the base portion 13 from a front side thereof simultaneously. Thirdly, insert the lower contacts 22 to the passageways 134 of base portion 13 and further disposed on the wafer 14 from a rear side of the base portion 13 at one time. Finally, bend the upper contacts 21 with the mounting sections 213 thereof extending out of the base portion 13. A spacer 50 is attached to the base portion 13 for positioning the upper and lower contact 21, 22 at a mounting end.

After assembly, the contact sections 214 of the upper contacts 21 are disposed in the recesses 147 and expose to a bottom face of the wafer 14, 15. The front wall 143 encloses the upper contacts 21 from an exterior at the front edge of the wafer 14, 15. The contact sections 222 of the lower contacts 22 are arranged in the grooves 145 and project out of the bottom face of the wafer 14, 15. The inner bar 146 separates the contacts sections 214 of the upper contacts 21 from the contact sections 222 of the lower contacts 22 along the mating direction. Next referring to FIGS. 9 to 11, 17-18, description will be made of a connector 100' according to a second embodiment of the present invention. The connector 100' comprises a plurality of electrical contacts 20', an insulative housing holding the electrical contacts 20' thereon, and a shield 30' surrounding all of the above mentioned components. The insulative housing comprises a base portion 13', two wafers 14'. 15', and a latch mechanism far fastening the wafers 14', 15' to the base portion 13'. The electrical contact 20' also includes a set of upper contacts 21' and a set of lower contacts 22'.

The lower contacts 22' are inserted into the base portion 13' and the wafer 14', 15' and each includes a body section 221' engaging with the insulative housing 10'. An elastic contact section 222' extends from one end of the body section 221' along a mating direction of the electrical connector 100' and has a convex bend 223'. The lower contacts 22' also include a mounting section 224' extending from the other end of the body section 221' for mounting to the PCB. The upper contacts 21' are attached to the wafer 14', 15' by insert molding and each includes a body section 211' engaging with the wafer 14', 15' at an upper side thereof, a connect section 212' bending from one end of the body section 211', and a mounting section 213' extending from the other end of the body section 211'. The body section 211' is on top of the contact section 214'. The contact portions 214', 222' of the upper contacts 21' and the lower contacts 22' are located on the lower side of the wafer 14', 15' and staggered along the mating direction of the electrical connector 100'. The contact portions 214' of the upper contacts 21' are arranged in a front position of the insulative housing and closer to a front edge of the wafer 14', 15' than the contact sections 222' of the lower contacts 22'. The contact points, namely the contact sections 214' and the convex bends 223' also staggered along a vertical direction thereby to mating with the plug at different height.

The electrical connector 100' is similar to the electrical connector 100 except the wafer 14', 15' and the base portion 13'. The base portion 13' comprises a rectangular body 130' provided with two receiving spaces 131' therein and a plurality of passageways 134' below the receiving spaces 131'. Each wafer 14', 15' comprises a tongue 140' and a retention portion 141' extending into the receiving space 131' of base portion 13'. The wafer 14', 15' comprises a top wall 142' and a front wall 143' perpendicular thereto.

The tongue 140' defines a plurality of grooves 145' corresponding to the passageways 134' and a plurality of recesses 147' corresponding to the receiving space 131'. An inner bar 146' separates the contact sections 214' of the upper contacts 21' from the contact sections 222' of the lower contacts 22' along the mating direction. The latch mechanism comprises a spring arm 144' arranged on the retention portion 141', and a retention section 133' arranged on the base portion 13' engaging with each other.

As illustrated in FIGS. 12 to 15, description will be made of a connector 100" according to a third embodiment of the present invention. The connector 100" comprises a plurality of electrical contacts 20", an insulative housing 10" holding the electrical contacts 20" thereon, and a shield (not shown) surrounding all of the above mentioned components. The insulative housing 10" comprises a base portion 13", two wafers 14", 15", and a latch mechanism for fastening the wafers 14", 15" to the base portion 13".

The electrical contact 20" also includes a set of upper contacts 21" and a set of lower contacts 22". Each upper contact 21" comprises a contact section 214" exposed to a receiving space for receiving the plug 200 and a mounting section 213" extending out of the base portion 13". Each lower electrical contact 22" comprises an elastic contact section 223∝ extending into the receiving space and a mounting section 224" extending out of the base portion 13".

The base portion 13" comprises a rectangular body 130" provided with two receiving spaces 131" and a support plate 135" projecting from the body and provided with a plurality of passageways 134". The support plate 135" is located at a lower side of the wafer 14", 15" and the contacts sections 222" of the lower contacts 22" are received therein.

Each wafer 14", 15" comprises a tongue 140" and a retention portion 141" extending into the receiving space 131" of base portion 13". The wafer 14", 15" comprises a top wall 142" and a front wall 143" perpendicular thereto. The tongue 140' defines a plurality of grooves 148" corresponding to the receiving space 131" and a plurality of recesses 147" corresponding to the grooves 148". An inner bar 146" separates the contact sections 214" of the upper contacts 21" from the contact sections 222" of the lower contacts 22" along the mating direction. The latch mechanism comprises a spring arm 144" arranged on the retention portion 141", and a retention section 133" arranged on a rear side of the base portion 13" engaging with each other.

Each upper contact 21" is pressed into the groves 148" and includes a retention section 215" for engaging therewith. The contact sections 214" of the upper contacts 21" are disposed in the recesses 147" and exposed to a bottom face of the wafer 14", 15". The front wall 143" encloses the upper contacts 21" from an exterior at a front edge of the wafer 14", 15".

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical connector for mating with a plug, comprising:

an insulative housing comprising a base portion and a wafer, and a latch mechanism fastened the wafer to the base portion, the insulative housing defining a mating direction for engaging with the plug;

a set of first contacts attached to the insulative housing each comprising a contact section mechanically connecting with the plug and a mounting section extending out of the insulative housing;

a set of second contacts attached to the insulative housing each comprising a contact section mechanically connecting with the plug and a mounting section extending out of the insulative housing; and wherein the contact sections of the first contacts are staggered with the contact sections of the second contacts along the mating direction, and wherein the contact sections of the first contacts are closed to a front edge of the wafer; wherein the latch mechanism comprises a spring arm arranged on the wafer, and a retention section arranged on the base portion for latching with the spring arm.

2. The electrical connector according to claim 1, wherein the contact sections of the second contacts are project out of a bottom face of the wafer.

3. The electrical connector according to claim 1, wherein the wafer enclosed the first contacts from an exterior at the front edge, and wherein the contact sections of the first contacts are exposed to a bottom face of the wafer.

4. The electrical connector according to claim 1, wherein the wafer comprises a tongue and a retention portion extending into the base portion, and wherein the tongue and the base portion defining a receiving opening for receiving the plug.

5. The electrical connector according to claim 1, wherein the first contacts are insert-molded to the wafer, and wherein the wafer defines a plurality of grooves for receiving the contacts sections of the second contacts.

*6. A receptacle connector, comprising:*

*an insulative housing having a base portion and a tongue portion extending therefrom;*

*at least a first contact terminal substantially submerged under a first surface of the tongue portion, and including a first contact section accessibly surfaced on a front area*

*of the first surface and a first mounting section extending beyond the insulative housing; and*

*at least a second contact terminal assembled to the base of the insulative housing, the second contact having a second contact terminal section extending along the first surface and dielectrically distant to the first contact section, and a second mounting section extending beyond the insulative housing;*

*wherein the first and the second contact sections are offset from each other, and the first contact section is closer to a front end of the second contact section; and*

*wherein the first and second contact terminals are assembled to the base of the insulative housing by a resilient retention portion coupled to the first and second contact terminals and engaging with a retention section arranged on the insulative housing for receiving the resilient retention portion, thereby holding the first and second contact terminals within the insulative housing.*

*7. The receptacle connector as recited in claim 6, wherein the first contact terminal is integrally molded with the tongue portion.*

*8. The receptacle connector as recited in claim 6, wherein the tongue portion defines at least one groove to receive the second contact section of the second contact terminal.*

*9. The receptacle connecter as recited in claim 6, wherein the second contact terminal is securely retained in the base portion.*

*10. The receptacle connector as recited in claim 6, wherein the tongue portion is assembled to the base portion by engagement between a spring arm located on the tongue portion and the retention section of the base portion.*

*11. An electrical connector for mating with a plug, comprising:*

*an insulative housing comprising a base portion and a wafer assembled to the base portion, the wafer having a tongue protruding forwardly;*

*a set of first contacts fastened to the wafer, each first contact comprising a non-elastic contact section located and exposed on a first side of the tongue along a thickness direction of the tongue and a mounting section extending out of the insulative housing; and*

*a set of second contacts retained to the insulative housing, each second contact comprising an elastic contact section exposed to the first side and projecting beyond a surface of the tongue on the first side, and a mounting section extending out of the insulative housing;*

*wherein the contact sections of the first contacts are arranged in a first row, the contact sections of the second contacts are arranged in a second row, and the first row is located in front of the second row and is closer to a front edge of the wafer; and*

*wherein the wafer comprises a conformable retention portion that engages with a retention section arranged on the insulative housing for receiving the conformable retention portion, thereby holding the wafer within the insulative housing.*

*12. The electrical connector according to claim 11, wherein the first contacts are inserted in the wafer by insert molding, and the second contacts are assembled to the insulative housing.*

*13. The electrical connector according to claim 11, wherein the tongue defines a plurality of grooves, and the contact sections of the second contacts are inserted into the wafer and arranged in the grooves.*

*14. The electrical connector according to claim 13, wherein the base portion defines a plurality of passageways, and the second contacts are inserted into the passageways from a rear side of the base portion and further extend to be disposed on the wafer.*

*15. The electrical connector according to claim 13, wherein the base portion defines a receiving space, and the wafer comprises the retention portion extending into the receiving space of the base portion.*

*16. The electrical connector according to claim 13, where in the tongue defines a plurality of recesses, the contact sections of the first contacts are disposed in the recesses, and an inner bar is located between the grooves and the recesses and separates the contact sections of the first contacts from the contact sections of the second contacts along a mating direction.*

*17. The electrical connector according to claim 11, wherein the base portion comprises a support plate projecting from the base portion and provided with a plurality of passageways, wherein the support plate is located at the first side of the tongue, and wherein the contact sections of the second contacts are received in the passageways.*

*18. The electrical connector according to claim 17, wherein each first contact is pressed into one of a plurality of grooves in the wafer and includes a retention section for engaging with the grooves.*

*19. An electrical connector, comprising:*

*an insulative housing enclosed by a metallic shell and commonly forming an assembly, said assembly defining a plug receiving space in a front portion thereof;*

*an insulative wafer defining opposite first and second faces, and integrally formed with a plurality of first terminals extending along a mating direction and fastened to the assembly to essentially occupy a portion of said plug receiving space under a condition that each of the first terminals defines a first contacting region essentially located around a first area on the first face of the wafer which is adjacent to a front edge of the wafer while other portions thereof offset from the first face toward the second face; and*

*a plurality of second terminals extending along the mating direction, each of said second terminals defining a second contacting region essentially located around a second area on the first face of the wafer under a condition that said second area is located behind the first area and both said first contacting region and said second contacting region face commonly toward the plug receiving space in a same direction opposite to said second face;*

*wherein the first terminals are not deflectable while the second terminals are deflectable during mating; and*

*wherein said wafer defines a plurality of grooves in the first face to respectively receive the corresponding second terminals; and*

*wherein the insulative wafer comprises a deformable retention portion that engages with a retention section arranged on the insulative housing for receiving the deformable retention portion, thereby holding the insulative wafer within the insulative housing.*

* * * * *